United States Patent
Buck, Jr.

(10) Patent No.: US 12,445,208 B1
(45) Date of Patent: Oct. 14, 2025

(54) MULTIPLEXED QUANTUM COMMUNICATION AND REMOTE SENSING

(71) Applicant: Lockheed Martin Corporation, Bethesda, MD (US)

(72) Inventor: Joseph Robert Buck, Jr., Superior, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 355 days.

(21) Appl. No.: 17/740,571

(22) Filed: May 10, 2022

(51) Int. Cl.
 *H04B 10/70* (2013.01)
 *G06N 10/70* (2022.01)

(52) U.S. Cl.
 CPC ............. *H04B 10/70* (2013.01); *G06N 10/70* (2022.01)

(58) Field of Classification Search
 CPC .............................. H04B 10/70; G06N 10/70
 See application file for complete search history.

(56) References Cited

U.S. PATENT DOCUMENTS

| | | | |
|---|---|---|---|
| 7,266,303 B2* | 9/2007 | Linden | H04L 27/00 398/140 |
| 2017/0324551 A1* | 11/2017 | Ahn | H04L 9/0855 |
| 2018/0048466 A1* | 2/2018 | Chen | H04B 10/70 |
| 2018/0176923 A1* | 6/2018 | Buburuzan | H04W 16/14 |
| 2020/0125402 A1* | 4/2020 | Griffin | G06N 10/60 |
| 2020/0241120 A1* | 7/2020 | Kim | G01S 17/10 |
| 2021/0072447 A1* | 3/2021 | Sakai | G02B 27/283 |
| 2022/0222567 A1* | 7/2022 | Reagor | G06N 10/40 |
| 2023/0401473 A1* | 12/2023 | Kumph | G06N 10/40 |

OTHER PUBLICATIONS

Advances in communications using optical vortices (Year: 2016).*

* cited by examiner

*Primary Examiner* — Bryan Y Lee (57) ABSTRACT

Provided herein are various techniques, protocols, and systems for providing enhanced quantum communications and remote sensing. In one example, a method includes generating a transmission signal by at least projecting qubits encoding payload data onto a physical carrier using at least one multiplexing scheme selected from among a plurality of multiplexing schemes, and transmitting, by the physical carrier, the transmission signal through a communication medium.

20 Claims, 5 Drawing Sheets

MULTIPLEXED QUANTUM COMMUNICATION AND REMOTE SENSING

TECHNICAL BACKGROUND

A quantum bit, commonly referred to as a qubit, can be employed to represent digital data in computing and communications. Qubits can encode bits of data using a superposition of states of various quantum elements, such as photon polarizations or electron spins. Example qubit types include superconducting qubits, cavity quantum electrodynamics-based qubits, ion trap-based qubits, and flying qubits. Computing systems can employ these qubits to efficiently perform various data processing algorithms that are computationally infeasible or impractical using conventional (non-quantum) systems. Current quantum computing approaches are typically based on each qubit representing data as a superposition of two states, with many qubits deployed concurrently to handle greater quantities of bits.

Communication systems, in contrast to computing systems, employ qubits and quantum phenomenon (such as entanglement) to transport data over a communication medium between remote communication nodes. Often, optical links form the communication medium by carrying specially prepared photons between communication nodes. Error correction is often required in quantum communication to conduct practical communications over noisy communication channels. Noise or loss over a real-world quantum communication channel can reduce accurate measurement of photons. Thus, quantum communication systems rely on multiple successive transmissions necessitating complex long-term coherent qubit storage to implement quantum error correction (QEC) for quantum communication channels, significantly limiting the efficiency and practicality of real-world implementations. Thus, there are significant real-world constraints that limit quantum communication channel capacity, such as the particular error correction techniques used to purify or distill entanglement to overcome noisy quantum communication channels.

Overview

Provided herein are various techniques, protocols, and systems for providing enhanced quantum communications and remote sensing (such as LIDAR). The examples herein expand quantum communications to multi-level protocols which allows increased information per quantum carrier (e.g. photon) with error correction built into the encoded transmission. The use of the multi-level protocols reduces the need for long-term coherent quantum storage which is employed to enable sequential or successive transmissions to produce error correction in traditional quantum communication systems. Thus, more efficient quantum communications between nodes or quantum transmission-based remote sensing can be achieved.

In one example, a method includes generating a transmission signal by at least projecting qubits encoding payload data onto a physical carrier using at least one multiplexing scheme selected from among a plurality of multiplexing schemes, and transmitting, by the physical carrier, the transmission signal through a communication medium.

In another example, an apparatus includes a multi-level qubit system configured to generate a transmission signal by at least projecting qubits encoding payload data onto a physical carrier using at least one multiplexing scheme selected from among a plurality of multiplexing schemes. The apparatus also includes a communication system configured to transmit, by the physical carrier, the transmission signal through a communication medium. The transmission signal might comprise error correction elements generated for a portion of the payload data and carried concurrently with the portion of the payload data using the at least one multiplexing scheme.

In yet another example, a system includes a transmitter node and a receiver node. The transmitter node is configured to generate a transmission signal by at least projecting qubits encoding payload data onto a physical carrier using at least one multiplexing scheme selected from among a plurality of multiplexing schemes, and transmit, by the physical carrier, the transmission signal through a communication medium. The receiver node is configured to receive the transmission signal after propagation through the communication medium, and demultiplex the transmission signal in accordance with the at least one multiplexing scheme to determine at least a portion of the payload data. Transmitting and receiving of the transmission signal can occur in a same communication node or in different communication nodes. The transmission signal can provide at least one among remote sensing of physical properties of a remote target and data communications between different communication nodes.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Discussed herein are various techniques, protocols, and systems for providing enhanced quantum communications and remote sensing, while reducing the impact of noise in associated communication channels. In addition to scaling up information rates of quantum communications by orders-of-magnitude, implementation of specific error codes is simplified and the reliance on coherent quantum storage is reduced. Either classical information or quantum state information can be transmitted over a quantum channel by encoding the information in quantum states. Examples of quantum communications can rely on specially prepared photons to carry quantum states. The time-of-arrival (time-bin entanglement) of photons or polarization of photons can be employed as a basis to encode quantum information. Quantum enhanced protocols typically employ superpositions of a two-level qubit system, which may include arbitrary basis sets. Quantum communication channels thus are typically capable of transmitting not only basis states, such as binary bits, but also quantum superposition states. Coherence of the superposition states must be sufficiently maintained during transmission over the quantum communication channel to provide successful communications between endpoints.

Error in transmissions can occur for both classical transmissions and quantum transmissions. Classical transmissions typically employ redundancy bits which comprise copies or mathematical combinations of data bits of the transmissions that can be used to recover missing or lost data. However, copying of quantum information is not possible according to the no-cloning theorem. Instead of copying data, the data in quantum transmissions, such as an individual qubit, can be spread onto a highly entangled state of several qubits. This process can be referred to as quantum entanglement distillation, and the term "basis sets" can refer to the individual qubits. Entanglement distillation can transform 'n' copies of an arbitrary entangled quantum state into a larger quantity of entangled pairs, expanding the basis sets. Entanglement distillation can thus be employed to compensate for noisy quantum channels and ensure the transmission of strongly correlated qubits between distant nodes. However, most implementations of quantum entanglement distillation require multiple successive transmissions and long-term coherent storage of quantum states to implement effective error correction. The examples herein provide for enhanced multiplexing techniques that do not require multiple successive transmissions to implement effective error correction, and thus can employ shorter-term coherent storage. In general, these examples expand quantum communications to a multi-level protocol which allows increased information per quantum carrier (e.g. photon) with some of the error correction built into the encoded transmission.

One metric of quantum communication channels is a measure of how closely an output of a quantum communication channel resembles the corresponding input, and this relates to how well a quantum communication channel can successfully transmit information. Quantum communication over large distances depends upon successful transmission and receipt of photon states. It should be understood that the examples herein do not have to be performed using entangled states, and can be achieved even with semi-classical implementations that rely on efficient photon state generation. Due to noise encountered in quantum communication channels, the quality or degree of entangled quantum states generally decreases (exponentially) with distance, reducing the communication efficiency over such channels. The multi-level protocols discussed herein provide orders-of-magnitude improvement for optical channels (in the information per photon). This allows both the capacity and rate of communication channels to be scaled together. In addition, error correction protocols can be implemented on the transmitted information to reduce the need for coherent storage on the receiver in order to implement corrected transmissions. The scaling architecture outlined herein allows practical quantum enhanced transmission rates. The architecture also allows real-time adapting to the communication channel properties or status to provide more optimized capacities and data rates. For example, this can provide enhanced communication and ranging operations through turbulence, daylight conditions, and in low intercept modes.

Figure 1:
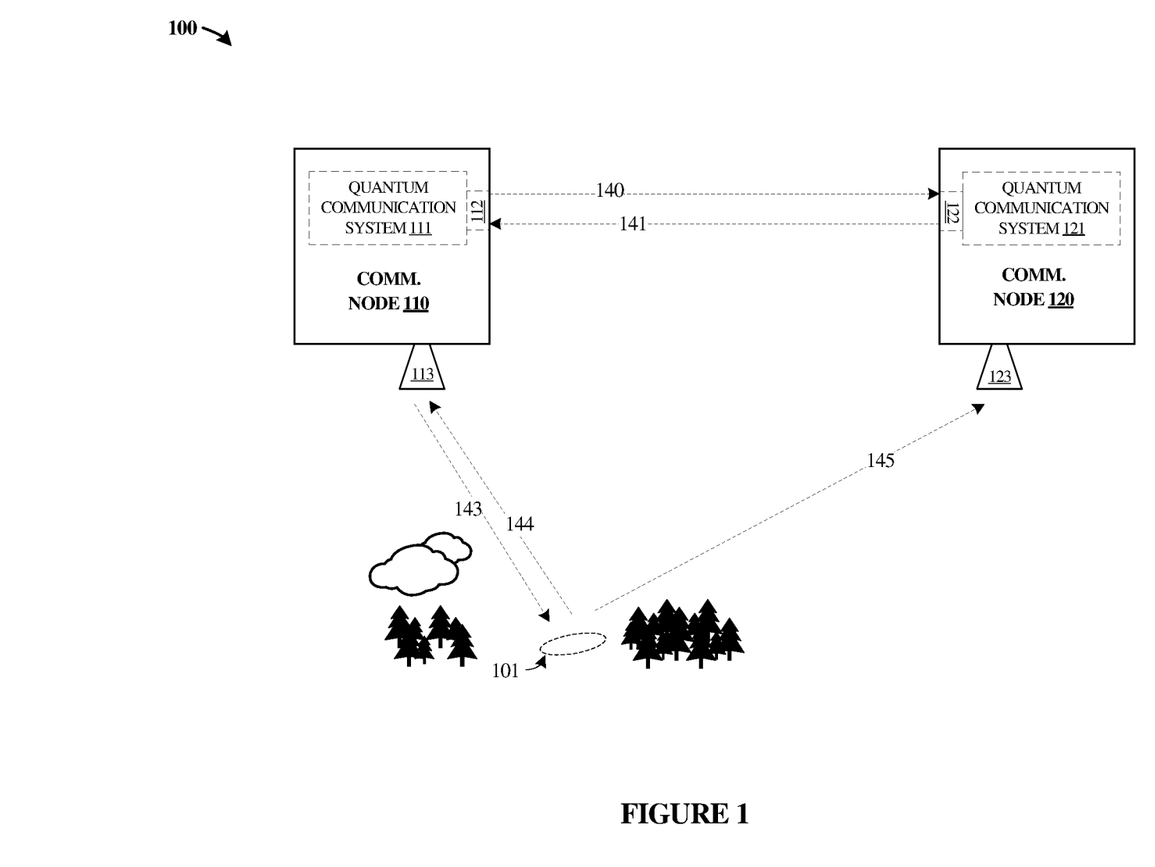
FIG. 1 illustrates a communication system in an implementation.

Turning now to a first example implantation for an enhanced quantum communication system, FIG. 1 is presented. FIG. 1 includes system 100 which includes communication node 110 and communication node 120. Communication node 110 includes quantum communication system 111, optical communication elements 112, and remote sensing elements 113. Communication node 120 includes quantum communication system 121, optical communication elements 122, and remote sensing elements 123.

Communication nodes 110 and 120 can engage in point-to-point communications or in remote sensing activities which may involve one or two nodes. For communication activities, communication nodes 110 and 120 can communicate over communication links 140-141. For remote sensing activities, such as for determining physical properties of target object 101, one or more among sensing links 143-145 can be employed, depending upon the sensing topology. The communication medium over which links 140-145 are carried might include at least one among a free space medium (e.g. atmosphere or space) and an optical fiber medium, but can vary based on the physical carrier and on application/use case. The communication medium in FIG. 1 is typically air or space, and thus the communication links can be referred to as optical links, laser communication links, or lasercom links, as well as LIDAR links in the case of remote sensing. However, similar techniques can be employed if another medium is employed, such as fiber optic cable, optical waveguides, or other optical media. Typically, communication node 110 and communication node 120 will have a range or distance between each other, which can vary if the nodes are moving or mobile.

Figure 2:
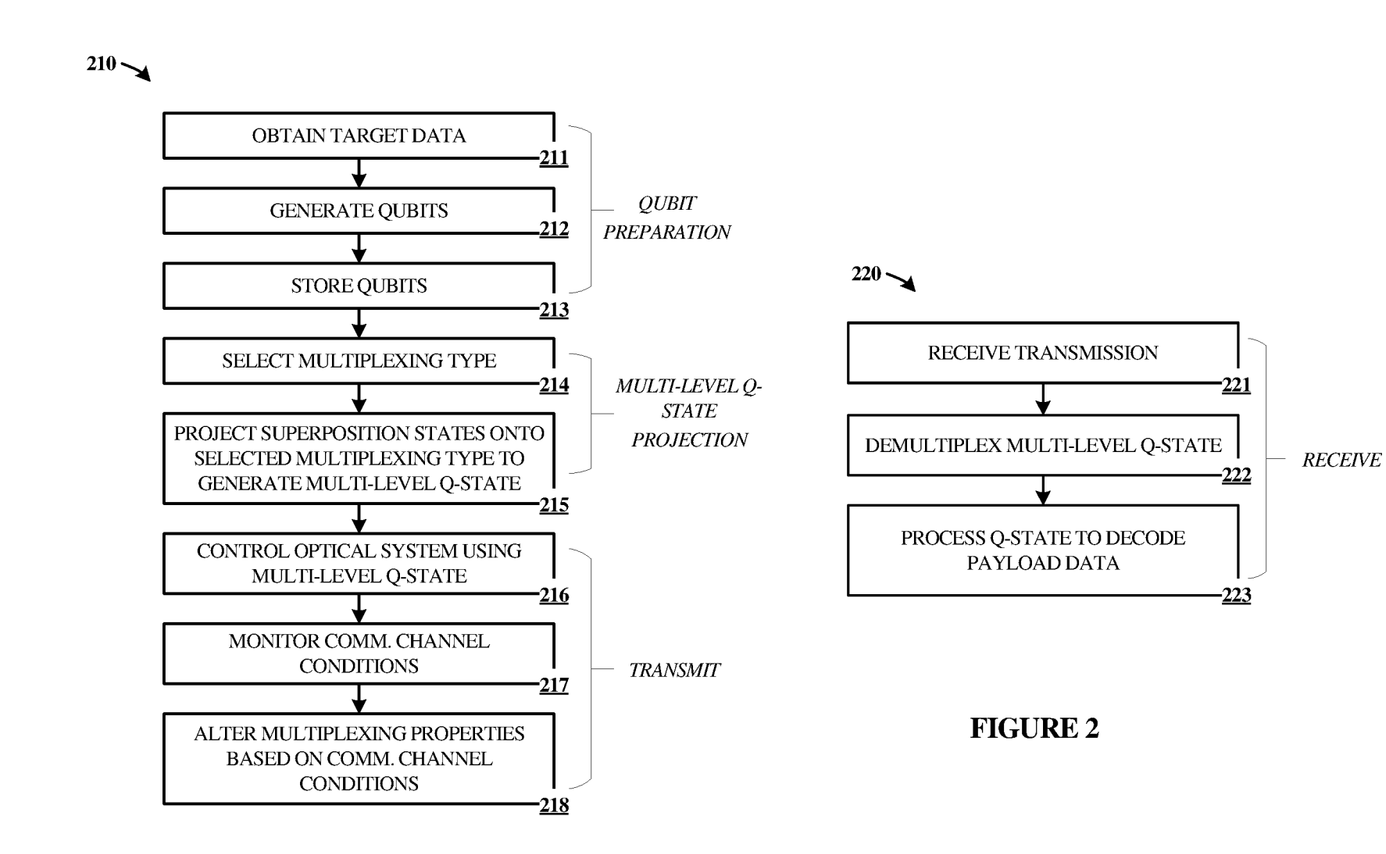
FIG. 2 illustrates example operations of a communication system in an implementation.

FIG. 2 is presented to illustrate example operations of system 100. Operations 210 relate to transmission of communications, and operations 220 relate to receipt of communications. The operations of FIG. 2 can be employed for both communication between nodes as well as remote sensing of target objects. For example, operations 220 can relate to transmitting and receiving a transmission signal in a same communication node or in different communication nodes. When the transmission signal is configured to provide communication of information or data between nodes, then the transmitting and receiving of a transmission signal is typically handled by different communication nodes, which can vary based on which node is presently transmitting. When the transmission signal is configured to provide remote sensing of physical properties of a remote target, such as target object 101, then transmitting and receiving of a transmission signal can be handled by a single node or different nodes. While the term transmission signal is employed when referencing both communications and remote sensing, it should be understood that other terminology can be employed for remote sensing, such as sensing or detection signal.

Turning now to the operations of FIG. 2, a first set of operations is grouped into a qubit preparation phase. In this set of operations, payload data is obtained (210) for later transmission. This payload data might comprise user data, user communications, or other information in the form of digital data for transfer to another node, such as employed in point-to-point communications or communication traffic routing. This payload data might instead comprise ranging data which provides for a baseline set of data, and observation of changes to such ranging data can indicate physical properties of target objects once transmitted, reflected, or refracted and observed by the transmitting node or a monitoring node different than the transmitting node. This payload data is obtained (211) which can be represented by a quantity of qubits which are generated (212) by a quantum superposition or entanglement process, such as generation of photons specially prepared to have a quantum state representing the payload data. From here, the qubits can be stored (213) within a quantum storage system, such as a coherent storage device which maintains quantum superpositions or entanglements over a target timeframe. For example, the qubits encoding the payload data can be stored in a quantum storage system configured to store the qubits within at least atomic states that maintain qubit coherence above a threshold coherence level on microsecond timeframes. This is in contrast to coherence timeframes for traditional quantum entanglement distillation with multiple successive transmissions or for quantum computing, which have coherence timeframes in the seconds or longer, requiring vastly more complex and costly storage techniques.

These stored qubits can then be employed to establish a transmission signal used to communicate or otherwise transfer the payload data via the encoding qubits over one or more quantum communication channels. However, as mentioned above, quantum communication channels carried over communication media can degrade qubit coherence due to noise, distance, and other factors. To overcome limitations of real-world quantum communication channels, quantum error correction techniques may be employed. These quantum error correction techniques can be used in combination with any classical error correction used on the payload data itself, but are specific to quantum channel coherence degradations.

Continuing with the operations of FIG. 2, a second set of operations is grouped into a multi-level quantum state projection phase. Multiplexing techniques are employed for multi-level quantum state projection onto a physical carrier, such as a photonic carrier. More than one superposition layer is thus employed, increasing the quantity of information transferred per physical carrier or per unit energy (e.g. per photon), with concurrent error correction built into a transmission signal. First, a multiplexing type is selected (214). One or more among a set of multiplexing schemes can be selected. Example multiplexing schemes include spectral multiplexing providing multiplexing over more than one optical wavelength, temporal multiplexing providing multiplexing over a time domain, and spatial multiplexing providing multiplexing over optical vortex states. At least one multiplexing scheme is selected based on an application or use case associated with the payload data and/or based on present communication channel conditions. The use case might include a remote sensing use case and a data communication use case. Present communication channel conditions included measured communication channel conditions for the communication medium over which the physical carrier is transported. This measurement can be based on at least a portion of a transmission signal, such as devoting a portion of the transmission signal to telemetry or signal conditions monitoring. This measurement can be based on a signal degradation level or coherence degradation level experienced over the channel at a receiving node. The communication channel conditions monitored for the communication medium might also comprise noise conditions for the communication channel associated with the communication medium and the physical carrier used to transmit over the communication medium.

Once a multiplexing type or types have been selected, then these multiplexing types are employed for a transmission signal. Specifically, communication node 110 projects (215) or maps superposition states of the qubits using selected multiplexing types to generate multi-level quantum states in a physical carrier. Projecting the qubits onto a physical carrier might include modulating or otherwise controlling optical transmitter elements that generate or direct an optical signal forming the transmission signal according to the at least one multiplexing scheme.

A third set of operations is grouped into a transmit phase. The transmission signal is generated (as noted above), such as by at least projecting qubits encoding payload data onto a physical carrier using at least one multiplexing scheme selected from among a plurality of multiplexing schemes. The transmission signal can include error correction elements generated for a portion of the payload data and carried concurrently with the portion of the payload data using the at least one multiplexing scheme. Optical systems are controlled using the multiplexing types forming multi-level quantum states to emit photons or other physical carriers toward a target. This target might be a target object in remote sensing applications, or a remote communication node in communication applications.

As mentioned above, a portion of the transmission signal might be employed to sense, monitor, or detect channel conditions (217) for the communication medium. This monitoring can include determining noise levels or loss levels based on a quantity of information transferred per unit energy, or per unit time, among other metrics. Based on these measurements, multiplexing properties can be altered (218) for the transmission signal. Altered multiplexing properties can include selecting a different multiplexing type, changing multiplexing redundancy levels, altering a quantity of the transmission signal dedicated to error correction, or other factors of altered for the transmission signal based on channel conditions.

During receive or detection operations, as noted in operations 220 of FIG. 2, a second node (e.g. communication node 120) or the original node (e.g. communication node 110) can receive the transmission signal emitted by communication node 110. In FIG. 1, a communication transmission signal might be carried over communication link 140 from communication node 110 to communication node 120. Alternatively, a remote sensing transmission signal might be carried over link 143 toward target object 101. This remote sensing transmission signal can reflect/refract off target object 101 and be returned to the source node (e.g. communication node 110) over link 144 or detected by a different node (e.g. communication node 120) over link 145. In addition, communication node 120 can include similar features as communication node 110 and initiate transmission signals for receipt by communication node 110 over link 141.

Regardless of the transmission style or receipt node, the transmission signals are received (221) after propagation through the associated communication medium, such as free space in FIG. 1—which may include partial/total vacuum portions and portions through an atmosphere. From here, a demultiplexing operation is performed on the received signal to demultiplex (222) the multi-level quantum state into individual qubits. This demultiplexing operation is performed in accordance with the at least one multiplexing scheme employed for the transmission signal. For example, when one or more among a spectral multiplexing, temporal multiplexing, and spatial multiplexing are employed, then the demultiplexing can reverse this multiplexing. Then, the qubits and associated quantum states are processed (223) to determine the at least a portion of the payload data. This payload data can be communication traffic transferred or routed between communication nodes, or can instead be specially prepared data used to sense physical properties of remote objects, such as by monitoring changes in properties between the transmitted and received signals. Successful remote sensing can often require an accumulation of information over time about a target object. However, such transmissions are typically difficult to intercept or surveil, due to low power/energy per transmission and the quantum encoding multiplexing techniques.

Returning to a description of example of the various elements of FIG. 1, communication nodes 110 and 120 both include quantum communication systems (111, 121) which form a core set of elements capable of generating qubits, encoding data with qubits, multiplexed projection of qubits onto a transmission signal, and transmission of such signals over a physical communication medium in concert with optical communication elements (112, 122) or remote sensing elements (113, 123). While the communication medium and physical carrier can comprise photonic or optical carriers in this example, other carriers might be employed, such as various elementary particles or composite particles capable of superimposed states. To provide for efficient transfer of optical energy among communication nodes, ranging equipment can be employed. This ranging equipment can determine distances between nodes as well as geometric/angular relationships in three-dimensional space. Results from the ranging equipment can be employed to tune or adjust optical transmissions for better receipt of the optical transmissions by target nodes.

Communication nodes 110 and 120 might comprise stationary or mobile nodes, which may include orbital satellites, spaceborne craft, airborne craft, surface devices, terrestrial communication nodes, water-based nodes, handheld devices, or other nodes which employ one or more communication and/or ranging links. Further systems and elements can be included in communication node 110 and communication node 120, such as RF communication systems, network interfaces, computing systems, guidance and aiming systems, or logistical systems providing power, propulsion, orientation, and navigation functions.

Optical communication elements 112 and 122 and remote sensing elements 113 and 123 each comprise various optical transmission circuitry and components, such as lasers, optics, and modulation circuitry to convert the electrical signaling into modulated optical signaling. Typically, a laser will be employed to create a carrier wavelengths or frequencies and signals will be modulated onto those carriers. Various optics can be employed to focus or direct the optical signal out of a first node and towards a second node, or towards a target object for remote sensing. Aiming or steering mechanisms, such as gimbals, deformable mirrors/lenses, or micro-electromechanical elements can be employed. Remote sensing elements can further comprise Light Detection and Ranging (LIDAR) equipment, 3-D laser scanning equipment, laser Doppler vibrometer (LDV) equipment, laser interferometer equipment, among other associated equipment. Optical receivers and various optical sensing circuitry and components can also be included, such as single photon detectors, photodiodes, avalanche photodiodes (APDs), Geiger-mode avalanche photodiodes, photomultiplier elements, along with various optics or mirrors to direct incident light onto the associated sensing elements. Incident optical signals can be converted into a different optical format or transferred from a free-space medium to a different medium, such as fiber optic or other waveguides. Many concurrent optical detectors might be employed to support a target bandwidth, as some detector technologies require reset delays after detection. For example, a 32×128 array of Geiger-mode avalanche photodiode detectors might be employed with associated optics to facilitate communications and pointing/orientation/aiming/gimbal functions.

Quantum communication systems 111 and 121 include equipment and devices to generate qubits and store qubits coherently for a period of time. Qubit generation equipment can generate single photons with high fidelity (99%) and form entanglement or superposition states among photons, along with encoding payload data onto the qubits. Quantum storage elements can include atomic or ion storage arrangements which can store superimposed quantum states. Example storage devices include atomic levels in vapor cell or ion traps, with multiple states having addressing capabilities. Storage input elements can translate phonic states to atomic states, while output elements can translate atomic states to light pulses or photonic states. Data acknowledge and control elements can be included to input binary payload data and output atomic states. Multi-level qubit elements are also included to control projection of payload data states into multiplexed modes of the physical carrier, such as photonic states. Further discussion on the elements that form quantum communication systems 111 and 121 as well as communication nodes 110 and 120 are included in FIGS. 3 and 4.

While links 140-145 might have a physical carrier or physical "link" layer that encompasses quantum signaling, higher layers of signaling and protocols, such as transport, network, or application layers, can be carried by links 140-145. For example, links 140-145 can comprise one or more data communication links. Links 140-145 can use various data protocols and formats, such as Ethernet, Internet Protocol (IP), wireless Ethernet or Wi-Fi (802.11x), cellular wireless technologies, other data interfaces, or some other communication format, including combinations, improvements, or variations thereof. Links 140-145 can include direct links or may work in conjunction with intermediate nodes comprising networks, systems, or devices, and can include a logical network link transported over multiple physical links.

Figure 3:
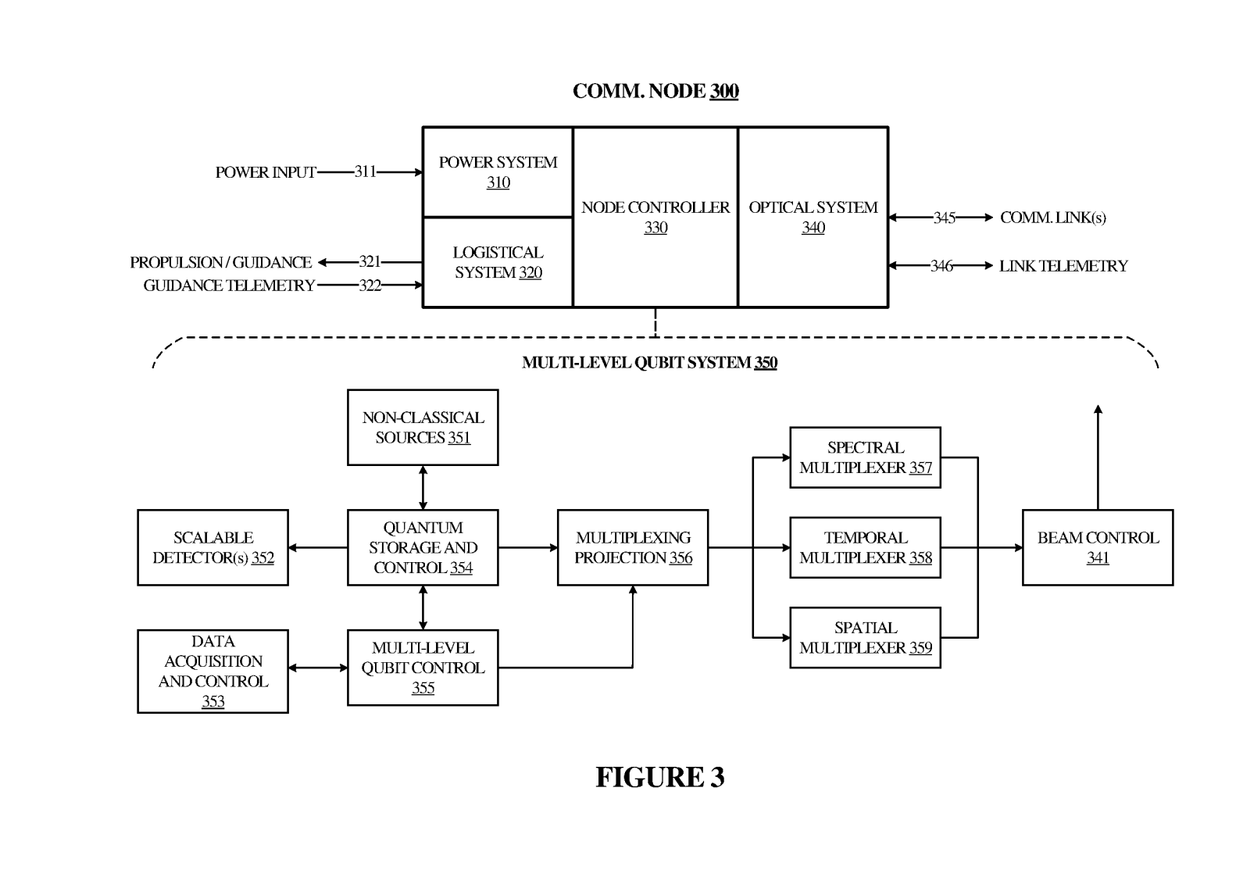
FIG. 3 illustrates a communication node in an implementation.

FIG. 3 illustrates communication node 300 in an implementation. Communication node 300 might be an example implementation of any among communication nodes 110 and 120 from FIG. 1, although variations are possible. Communication node 300 includes power system 310, logistical system 320, node controller 330, and optical system 340. The various elements of communication node 300 can communicate and interface over corresponding links and interconnect (not shown in FIG. 3 for clarity), such as power links, communication links, control links, telemetry links, user interface links, and the like. Communication node 300 can exchange communications with other nodes over link(s) 345, or perform remote sensing activities over links 345. Optional link telemetry 346 might be sideband signaling to indicate channel conditions from another node, or quality of signaling received by another node. This information might instead be determined from properties of link(s) 345.

Power system 310 includes components that provide electrical power to other elements of communication node 300. The electrical power might be derived from on-board generation systems, such as solar panels, batteries, or radioisotope thermoelectric generators (RTG), thermoelectric generators (TEG), among other power generation systems. The electrical power might be received from external sources, such as other on-craft systems or local utilities. Power input, for example, can be provided over link 311, and power system 310 can condition, filter, and convert any electrical power to on-board needs of communication node 300.

Logistical system 320 includes propulsion and navigation elements that can comprise various equipment to move or orient communication node 300. When communication node comprises a satellite device, logistical system 320 can move or orient the satellite device with respect to neighboring satellite devices, move into different orbital configurations, adjust relative distances among satellite devices, or perform orientation/attitude adjustments. Logistical system 320 can receive guidance telemetry over link 322 from external sensors or external sources, such as accelerometers, positioning sensors, gyroscopic sensors, and the like. Logistical system 320 can provide propulsion or guidance command and control over link 321 to physical systems which alter positioning or orientation of a corresponding device or vehicle. A vehicle controlled by logistical system 320 might comprise various engines, thrusters, inertial control and manipulation elements, or other elements capable of making adjustments to position, orientation, orbit, speed, or other movement parameters. Logistical system 320 can also comprise distance sensing equipment or navigation equipment to determine relative distances from Earth or from other satellite devices. This distance sensing equipment or navigation equipment can comprise laser ranging equipment, radar equipment, or signal strength sensing equipment. Further examples can employ systems to determine geographic coordinates using one or more global positioning systems (GPS, GLONASS, Galileo), star-tracking systems, visual tracking systems, accelerometer-based tracking systems, or dead-reckoning systems, among others. When communication node 300 comprises a terrestrial, handheld, or stationary node, then elements of logistical system 320 might be omitted. Likewise, when communication node 300 comprises an airborne or water-based node, associated propulsion and navigation elements can be included.

Optical system 340 includes optics and the optical pathway of a laser communications signal or laser remote sensing signal. Optical system 340 includes various optical media interface elements to emit and receive photonic signals over free space (air or vacuum) or optical fiber media, as well as maintain optical links or optical pointing configurations. Optical system 340 can receive control instructions from node controller 330 to alter configurations of optics or mirrors that affect an optical link, such as controlling deformable mirrors or optics, tilt/tip mirrors, pointing/aiming/gimbal, or other optic configuration parameters. In some examples, bulk movement of communication node 300 can be provided by logistical system 320 and fine grain movement provided by optics of optical system 340. Optical system 340 might inform logistical system 320 to perform bulk movements, such as firing of thrusters, deploying mass shifting techniques, engaging flywheel or gyroscopic elements, momentum wheels, or other similar elements.

Node controller 330 implements multi-level qubit system 350, which is representative of quantum communication system 111 or 121 of FIG. 1. Node controller 330 can comprise classical (non-quantum) elements as well as quantum and quantum-adjacent elements. Examples of classical elements include processing devices (e.g. CPUs) and associated support circuitry and peripherals, optics, mechanical assemblies, structures, thermal control elements, and chassis elements. Examples of non-classical elements are discussed below.

Data acquisition and control element 353 includes circuitry and systems to obtain or acquire digital data comprising payload data, remote sensing input data, communications traffic, packetized data, or other data including any associated network addressing or metadata. Data acquisition and control element 353 might include analog-to-digital (ADC) conversion circuitry, memory or storage devices and media, interface bus elements, network interface controllers (NICs), media access control elements, data processing systems, pseudo-random number/code generators, and other similar circuitry and systems. Payload data is then provided to multi-level qubit control element 355.

Multi-level qubit control element 355 can produce multi-level qubit representations of payload data in conjunction with multiplexing projection element 356. The qubits employed for such operations are stored by quantum storage and control element 354, which stores qubit states or corresponding quantum superposition states representing the payload data as atomic levels. These atomic levels might correspond to atomic levels within vapor cells or ion traps, among other configurations, and the atomic states typically have addressing capability to store and later retrieve/access corresponding quantum states. Retrieval of the quantum states comprises light pulses derived from the atomic states. The source qubits for encoding or entangling with the payload data are generated by non-classical sources 351. Non-classical sources 351 generate high-fidelity single photons, such as sub-Poissonian light. The non-classical sources can include specially configured laser sources, atomic emission sources, radioactive decay sources, or other suitable photonic sources.

As mentioned, the stored quantum states representing the payload data can be projected onto multiplexed modes by multiplexing projection element 356 in conjunction with multi-level qubit control element 355. Multiplexing projection element 356 can obtain indications of quantum communication channel conditions or use case, among other indications, and select one or more multiplexing projection arrangements for the payload data encoded by the qubits. This entails projecting qubits onto the selected multiplex modes. Multiplexing projection element 356 expands the encoding basis sets in a combination of spectral, spatial, or temporal modes within a quantum communication channel. This includes any mixture of one or all of these encoding basis sets, where "basis sets" refers to the quantum states of the individual 'source' qubits that encodes the payload data. A further discussion on an example process of multi-level qubit handling and multiplexing projection is included in FIG. 5.

For spectral multiplexer 357, a set of non-overlapping frequencies is selected over which the basis sets are expanded. The set of frequencies are typically selected to be as close to each other as possible while still allowing for effective splitting or demultiplexing at the receiving end of the transmission to recover the basis sets and payload data. This might be analogous to frequency-domain multiplexing in RF communications, but performed using optical wavelengths as a physical carrier and quantum entanglement distillation to spread or expand the basis sets. Spectral multiplexer 357 might include orthogonal frequency-division multiplexing (OFDM) techniques to further increase communication channel density.

For temporal multiplexer 358, a time sequencing or transmit time within given window of time is selected over which the basis sets are expanded. This can include shift register-style of time sequencing, delay lines, or other techniques.

For spatial multiplexer 359, orthogonal modes of vortex beams are selected over which the basis sets are expanded. Vortex beams comprise optical vortices having helical structural configurations for the phase-front along the axis of travel as well as changes in intensity of beams. Vortex beams can also be referred to as photonic quantum vortices. The vortex mode is given an integer number, called the topological charge, which corresponds to the quantity of twists the light does over one wavelength. A beam might be established into a vortex arrangement using any of several techniques, such as computer-generated holograms, spiral-phase delay structures, or birefringent vortices in materials. Selected vortex modes can be used to expand the basis sets, and carry additional information beyond that of a single mode. Other multiplexing techniques might be applicable and be applied along with the ones mentioned herein.

Once a multiplexed signal has been generated, this signal is provided to optical system 340 which establishes a transmission signal for transfer to another node or for performing remote sensing activities. Beam control 341 can include various photonic beam control features, such as those discussed above for optical system 340. This can include beam aiming and gimbal control, control of various optics, shutters, and the like. The transmission signal is eventually received by either another communication node or by communication node 300 (in the case of remote sensing), and scalable detectors 352 can sense such signals. Scalable detectors 352 are included in a receiver end of communication links or remote sensing links. Scalable detectors 352 can comprise single photon detectors, such as Geiger arrays, along with various receiver and focusing optics.

Remote sensing activities are typically shot noise limited, where a mixing signal is employed to get gain and local oscillator noise can dominate noise inputs. In contrast, communication activities are typically Shannon limit constrained. By use of the multiplexed or multi-level qubit systems and techniques herein, more information can be transferred per unit energy, which equates to less total energy or more distant communications and ranging. The multiplex type can be selected based on channel conditions or use case. For example, in remote sensing applications from orbital satellites, turbulence can be encountered through the atmosphere when looking down from orbit, and this may warrant selection away from temporal multiplexing due to rapidly changing conditions over time. Thus, an optimized error correction is provided for transmission signals, where the multiplexing type and degree of multiplexing (e.g. amount of frequency spread, quantity of time sequenced modes, or quantity of vortex modes) can lead to greater information per unit energy and greater recovery of the payload data at a receiver. The examples herein provide for enhanced multiplexing techniques that do not require multiple successive transmissions to implement effective error correction, and thus can employ shorter-term coherent storage. In general, these examples expand quantum communications to a multi-level protocol which allows increased information per quantum carrier (e.g. photon) with some of the error correction built into the encoded transmission.

Moreover, the examples herein provide an architecture for encoding/decoding in spectral channelization, encoding/decoding in vortex beams, and encoding/decoding in the temporal domain-including combinations thereof. To facilitate this multiplexed architecture, elements are provided for storing multiplexed information, which can provide for combining all multiplexing techniques in arbitrary combinations that can depend on communication channel conditions or use cases. A shift key register architecture can be employed for storage/measurement interfaces, with protocols for optimizing channel encoding useful for both communications between nodes and remote sensing of distant objects. Scaling of the information capacity of the communication channel can be achieved by selecting the appropriate multiplexing technique or techniques which suits the information capacity desired moment to moment. This can enable scaling a super-additive channel capacity to multi-level protocols.

Figure 4:
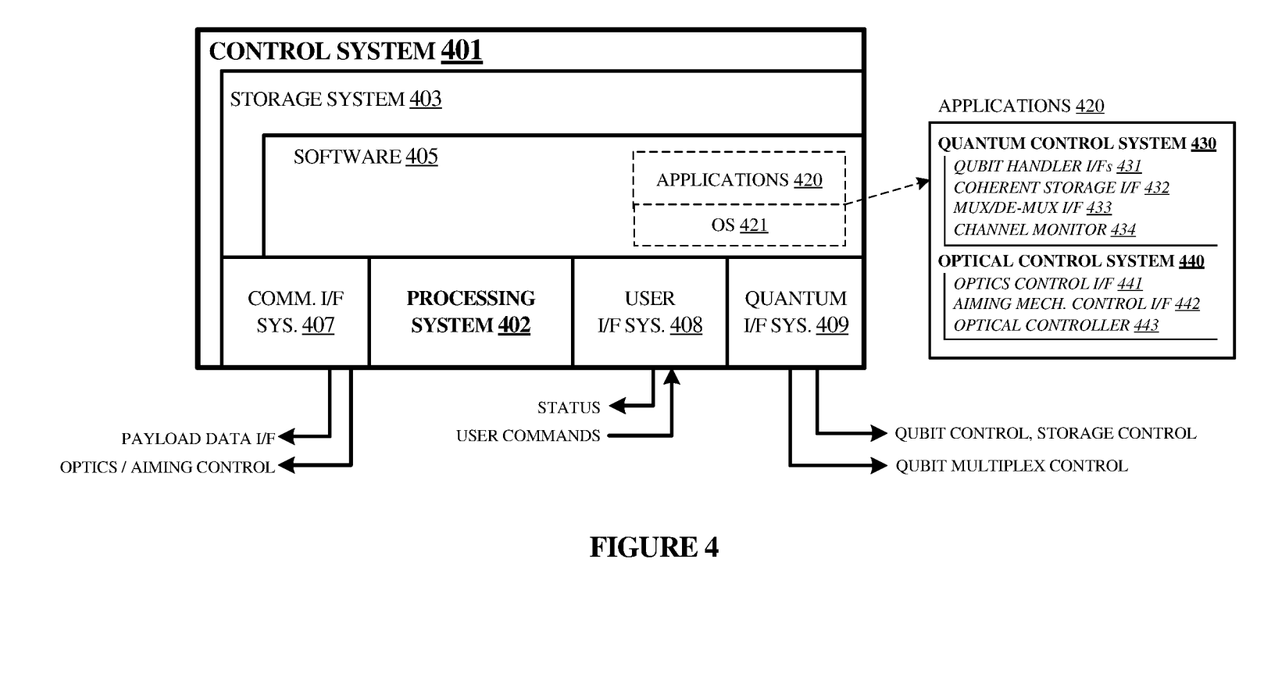
FIG. 4 illustrates a control system for a communication node in an implementation.

FIG. 4 illustrates control system 401 and associated software 405 in an implementation. FIG. 4 illustrates control system 401 that is representative of any system or collection of systems in which control portions of the various operational architectures, scenarios, and processes disclosed herein may be implemented. Control system 401 might implement control circuitry and software for any of the circuitry, elements, modules, systems, apparatuses, and the like discussed herein. For example, control system 401 can be used to implement elements of nodes 110 and 120 of FIG. 1, or node 300 FIG. 3. Control system 401 might implement or control portions of optical communication elements 112 and 122 and remote sensing elements 113 and 123, or portions of quantum communication systems 111 and 121 of FIG. 1. Control system 401 might implement or control portions of power system 310, logistical system 320, node controller 330, or media interface 340 of FIG. 3.

Control system 401 may be implemented as a single apparatus, system, or device or may be implemented in a distributed manner as multiple apparatuses, systems, or devices. Control system 401 includes, but is not limited to, processing system 402, storage system 403, software 405, communication interface system 407, user interface system 408, and quantum interface system 409. Processing system 402 is operatively coupled with storage system 403, communication interface system 407, user interface system 408, and quantum interface system 409.

Processing system 402 loads and executes software 405 from storage system 403. Software 405 includes applications 420 comprising quantum control system 430 and optical control system 440, which are representative of the processes, services, controls, and platforms discussed with respect to the included Figures. When executed by processing system 402 to provide control of quantum-enhanced communication and ranging, among other services, software 405 directs processing system 402 to operate as described herein for at least the various processes, operational scenarios, and sequences discussed in the foregoing implementations. Control system 401 may optionally include additional devices, features, or functionality not discussed for purposes of brevity.

Referring still to FIG. 4, processing system 402 may comprise a microprocessor and processing circuitry that retrieves and executes software 405 from storage system 403. Processing system 402 may be implemented within a single processing device, but may also be distributed across multiple processing devices or sub-systems that cooperate in executing program instructions. Examples of processing system 402 include general purpose central processing units, application specific processors, and logic devices, as well as any other type of processing device, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. In addition to computer readable storage media, in some implementations storage system 403 may also include computer readable communication media over which at least some of software 405 may be communicated internally or externally. Storage system 403 may be implemented as a single storage device, but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions comprising applications 420 and operating system 421 that provide control of quantum-enhanced communication and ranging, among other services. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software or other application software, in addition to or that include quantum control system 430 and optical control system 440. Software 405 may also comprise firmware or some other form of machine-readable processing instructions executable by processing system 402.

Software 405, when loaded into processing system 402 and executed, may transform a suitable apparatus, system, or device (of which control system 401 is representative) overall from a general-purpose computing system into a special-purpose computing system customized to provide control of quantum-enhanced communication and ranging, among other services. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors. For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Applications 420 can include quantum control system 430 and optical control system 440. Optical control system 440 can interface with quantum-associated elements and circuitry through quantum interface system 409. Quantum control system 430 includes qubit handler interface 431, coherent storage interface 432, multiplexer/de-multiplexer interface 433, and channel monitor 434. Optical control system 440 includes optics control interface 441, aiming mechanism control interface 442, and optical controller 443.

Quantum control system 430 comprises various control algorithms and processes for interfacing and controlling external quantum elements. These include any of the quantum and quantum-adjacent elements in FIGS. 1 and 3. Example modules within quantum control system 430 include qubit handler interface 431 which interfaces with and controls generation of qubits, and encoding of payload data onto qubits. Coherent storage interface 432 can interface and control quantum storage elements, such as atomic state storage devices to store quantum states encoding the payload data for later multiplexing and transfer. Multiplexer/de-multiplexer interface 433 selects among multiplexing types based on channel conditions or use cases, among other conditions, and instructs a multiplexer to project qubits encoding the payload data onto a set of multiplexing states. De-multiplexing can entail instructing demultiplex circuitry or elements on which multiplexing schemes, types, or degrees were employed over the communication channel. Channel monitor 434 can monitor channel conditions based in part on a portion of the transmission signal transmitted or received. Example metrics which are monitored include recovered data rates at the receiver, quantum coherence levels achieved over the channel, or entanglement status, as well as external factors such as weather, temperature, time of day, time of year, latitude/longitude, altitude, orbital configuration, available transmit power, and other factors.

Optical control system 440 handles optics control, aiming control, and control of other elements of the optical pathway of an optical communications node or optical remote sensing node. Optics control interface 441 can provide control instructions to alter configurations of optics or mirrors that affect an optical link, such as controlling deformable mirrors or optics, tilt/tip mirrors, or other optics. Aiming mechanism control interface 442 can interface with and control mechanisms associated with an optical link, if employed. These mechanisms can include gimbals, servos, movable mounts, and other mechanisms. Optical controller 443 can receive as input various inertial status, optic status, orientation status, alignment status, or other information related to the pointing, orientation, or alignment of optical elements or mechanisms of a lasercom node. Optical controller 443 can process this information along with the range or indications of the range provided by a node ranging system to determine adjustments or commands to control the optics or mechanisms associated with a lasercom beam or remote sensing beam. In some examples, bulk movement of a device comprising a communication and remote sensing node might be required, such as when employed in a satellite device. Optical controller 443 might inform logistical control element of the vehicle to perform bulk movements, such as firing of thrusters, deploying mass shifting techniques, engaging flywheel or gyroscopic elements, momentum wheels, or other similar elements.

Communication interface system 407 may include communication connections and devices that allow for communication with other computing systems, control interfaces, or electrical components (not shown) over communication links or communication networks (not shown). Examples of connections and devices that together allow for inter-system communication may include transceivers, network interface controllers, antennas, power amplifiers, RF circuitry, optical communication systems, and other communication circuitry. The connections and devices may communicate over communication media to exchange communications with other computing systems or networks of systems, such as metal, glass, air, or any other suitable communication media. Communication interface system 407 may include portions of quantum interface system 409.

Quantum interface system 409 comprises various hardware and software elements for interfacing with quantum-associated elements and circuitry. These can include electrical communication interfaces which interact over discrete control lines to associated quantum elements and circuitry. Quantum elements and circuitry might include various digital interfaces, network interfaces, optical interfaces, or other control interfaces and systems which can be handled accordingly by quantum interface system 409. Quantum interface system 409 might include analog-to-digital or digital-to-analog conversion circuitry when the quantum elements and circuitry include non-digital control schemes and interfaces. Quantum interface system 409 might include elements of communication interface system 407 or communicate through elements of communication interface system 407.

Communication between control system 401 and other elements or systems, such as optics/aiming equipment (not shown), and quantum communication and multiplexing equipment may occur over communication links or communication networks and in accordance with various communication protocols, combinations of protocols, or variations thereof. For example, control system 401 when implementing a control device, might communicate with optical or quantum equipment over corresponding digital communication links comprising Ethernet interfaces, serial interfaces, serial peripheral interface (SPI) links, inter-integrated circuit (I2C) interfaces, universal serial bus (USB) interfaces, UART interfaces, or wireless interfaces. When network links are employed, examples networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some network communication protocols that may be used include, but are not limited to, the Ethernet, Internet protocol (IP, IPv4, IPv4, etc . . . ), the transmission control protocol (TCP), and the user datagram protocol (UDP), as well as any other suitable communication protocol, variation, or combination thereof.

User interface system 408 may be optionally included, and comprise a software or virtual interface such as a terminal interface, command line interface, or application programming interface (API). User interface system 408 may also include physical user interfaces, such as keyboard, a mouse, a voice input device, or a touchscreen input device for receiving input from a user during assembly, manufacturing, or testing operations. Output devices such as a display interfaces, audio interfaces, web interfaces, terminal interfaces, and other types of output devices may also be included in user interface system 408. User interface system 408 can provide output and receive input over a network interface, such as communication interface system 407. In network examples, user interface system 408 might packetize data for receipt by a display system or computing system coupled over one or more network interfaces. User interface system 408 may comprise API elements for interfacing with users, other data systems, other user devices, web interfaces, and the like. User interface system 408 may also include associated user interface software executable by processing system 402 in support of the various user input and output discussed above. Separately or in conjunction with each other and other hardware and software elements, the user interface software and user interface devices may support a console user interface, graphical user interface, or any other type of user interface.

Figure 5:
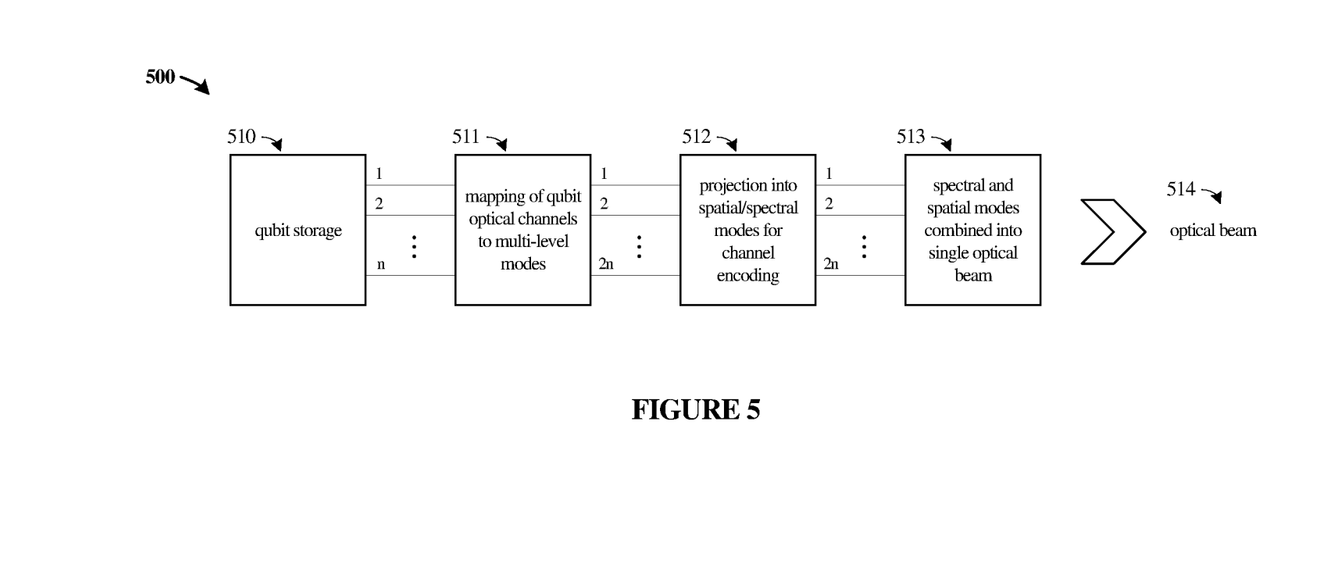
FIG. 5 illustrates multi-level qubit handling and multiplexing projection in an implementation.

FIG. 5 is a diagram illustrating an example process 500 of multi-level qubit handling and multiplexing projection. Operations of FIG. 5 can be performed by various elements discussed herein, such as quantum communication system 111 or 121 in FIG. 1, communication node 300 in FIG. 3, or control system 401 of FIG. 4. For reference, a classical bit can have two associated states represented by $|\psi\rangle = |0\rangle$ or $|1\rangle$. In contrast, a quantum bit or qubit can allow for superposition states, and have associated states represented by $|\psi\rangle = a_0|0\rangle + a_1|1\rangle$, where $|a_0|^2 + |a_1|^2 = 1$. In example process 500, multi-level qubits can be employed, with associated states represented by $|\psi\rangle = a_0|0\rangle + a_1|1\rangle + \ldots + a_n|n\rangle$, where $|a_0|^2 + |a_1|^2 + \ldots + |a_n|^2 = 1$. Thus, a larger quantity of states than achievable by classical bits or conventional qubits can be reached using the multi-level qubits discussed herein.

In process 500, qubit storage element 510 can produce multi-level qubit representations of payload data. In this example, a quantity of 'n' qubits are stored by element 510, and provided to element 511. The qubits employed for such operations can be stored as qubit states or corresponding quantum superposition states representing the payload data as atomic levels. These atomic levels might correspond to atomic levels within vapor cells or ion traps, among other configurations, and the atomic states typically have addressing capability to store and later retrieve/access corresponding quantum states. Retrieval of the quantum states comprises light pulses derived from the atomic states.

In element 511, a mapping of the 'n' qubit optical channels to '2n' multi-level modes is achieved, followed by element 512 performing projection into 2n spatial/spectral modes for channel encoding. Thus, the stored quantum states representing the payload data can be projected onto multiplexed modes. Elements 511 and 512 can obtain indications of quantum communication channel conditions or use case, among other indications, and select one or more multiplexing projection arrangements for the payload data encoded by the qubits. This entails projecting qubits onto the selected multiplex modes. Element 512 expands the encoding basis sets in a combination of spectral, spatial, or temporal modes within a quantum communication channel. This includes any mixture of one or all of these encoding basis sets, where "basis sets" refers to the quantum states of the individual 'source' qubits that encodes the payload data.

For a spectral multiplexing, a set of non-overlapping frequencies is selected over which the basis sets are expanded. The set of frequencies are typically selected to be as close to each other as possible while still allowing for effective splitting or demultiplexing at the receiving end of the transmission to recover the basis sets and payload data. This might be analogous to frequency-domain multiplexing in RF communications, but performed using optical wavelengths as a physical carrier and quantum entanglement distillation to spread or expand the basis sets. For a spatial multiplexing, orthogonal modes of vortex beams are selected over which the basis sets are expanded. Vortex beams comprise optical vortices having helical structural configurations for the phase-front along the axis of travel as well as changes in intensity of beams. Vortex beams can also be referred to as photonic quantum vortices. The vortex mode is given an integer number, called the topological charge, which corresponds to the quantity of twists the light does over one wavelength. A beam might be established into a vortex arrangement using any of several techniques, such as computer-generated holograms, spiral-phase delay structures, or birefringent vortices in materials. Selected vortex modes can be used to expand the basis sets, and carry additional information beyond that of a single mode. Other multiplexing techniques might be applicable and be applied along with the ones mentioned herein, such as temporal multiplexing. In temporal multiplexing, a time sequencing or transmit time within given window of time is selected over which the basis sets are expanded. This can include shift register-style of time sequencing, delay lines, or other techniques.

Once a multiplexed signal has been generated by elements 511-512, this signal is provided to element 513 which establishes a combined transmission signal 514 for transfer to another node or for performing remote sensing activities. Element 513 can include various photonic beam control features and associated optics to combine spectral and spatial modes into a single optical beam. These features can include wavelength division multiplexing elements, such as wavelength combination optics, and various optical combiners for combining different beams having different spatial modes.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

Any various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A method, comprising:
   generating carrier qubits comprising quantum superposition states by at least expanding first basis sets of encoding qubits encoding payload data to carrier qubits having second basis sets expanded from the encoding qubits;
   generating a transmission signal by at least projecting the carrier qubits onto a physical carrier comprising an adjustable multiplexing scheme;
   selecting the adjustable multiplexing scheme based at least on communication medium conditions and a desired information capacity of the transmission signal by at least selecting a multiplexing degree and a multiplexing type from one or more among a spectral multiplexing scheme comprising a selected quantity of non-overlapping frequencies and a spatial multiplexing scheme comprising a selected quantity of optical vortex states; and
   transmitting, by the physical carrier, the transmission signal through a communication medium.

2. The method of claim 1, comprising:
   receiving the transmission signal after propagation through the communication medium;
   demultiplexing the transmission signal in accordance with the adjustable multiplexing scheme to determine at least a portion of the payload data.

3. The method of claim 2, comprising:
   transmitting and receiving the transmission signal in a same communication node, wherein the transmission signal is configured to provide remote sensing of physical properties of a remote target.

4. The method of claim 2, comprising:
   transmitting and receiving the transmission signal in different communication nodes, wherein the transmission signal is configured to provide at least one among remote sensing of physical properties of a remote target and data communications between the different communication nodes.

5. The method of claim 1, wherein the transmission signal comprises quantum error correction elements formed by the second basis sets of the carrier qubits carried using the adjustable multiplexing scheme.

6. The method of claim 1, comprising:
   measuring quantum communication channel conditions for the communication medium comprising at least a coherence degradation level determined using at least a portion of the transmission signal;
   altering a quantity of the transmission signal dedicated to error correction based at least on the quantum communication channel conditions.

7. The method of claim 6, wherein the communication channel conditions monitored for the communication channel comprise conditions for the communication medium and the physical carrier used to transmit over the communication medium, and wherein the communication medium comprises at least one among a free space medium and an optical fiber medium.

8. The method of claim 1, comprising:
   further selecting the adjustable multiplexing scheme based on a use case associated with the payload data, wherein the use case comprises at least one among a remote sensing use case and a data communication use case.

9. The method of claim 1, comprising:
   obtaining the qubits encoding the payload data from a quantum storage system configured to store the qubits within at least atomic states that maintain qubit coherence above a threshold coherence level on microsecond timeframes.

10. The method of claim 1, wherein the multiplexing type further comprises a temporal multiplexing providing multiplexing over a time domain.

11. The method of claim 1, wherein projecting the qubits onto the physical carrier comprises modulating at least one optical transmitter that generates an optical signal comprising the transmission signal according to the adjustable multiplexing scheme.

12. An apparatus, comprising:
a multi-level qubit system configured to:
    generate carrier qubits comprising quantum superposition states by at least expanding first basis sets of encoding qubits encoding payload data to carrier qubits having second basis sets expanded from the encoding qubits;
    generate a transmission signal by at least projecting the carrier qubits onto a physical carrier comprising an adjustable multiplexing scheme; and
    select the adjustable multiplexing scheme based at least on communication medium conditions and a desired information capacity of the transmission signal by at least selecting a multiplexing degree and a multiplexing type from one or more among a spectral multiplexing scheme comprising a selected quantity of non-overlapping frequencies and a spatial multiplexing scheme comprising a selected quantity of optical vortex states; and
a communication system configured to transmit, by the physical carrier, the transmission signal through a communication medium.

13. The apparatus of claim 12, comprising:
the communication system configured to receive the transmission signal after propagation through the communication medium;
the multi-level qubit system configured to demultiplex the transmission signal in accordance with the adjustable multiplexing scheme to determine at least a portion of the payload data.

14. The apparatus of claim 12, wherein the transmission signal comprises quantum error correction elements formed by the second basis sets of the carrier qubits carried using the adjustable multiplexing scheme.

15. The apparatus of claim 12, comprising:
the multi-level qubit system configured to alter a quantity of the transmission signal dedicated to error correction based at least on quantum communication channel conditions measured for the communication medium;
wherein the quantum communication channel conditions monitored for the communication medium comprises a coherence degradation level for a quantum communication channel associated with the communication medium and the physical carrier used to transmit over the communication medium, and wherein the communication medium comprises at least one among a free space medium and an optical fiber medium.

16. The apparatus of claim 12, comprising:
the multi-level qubit system configured to further select the adjustable multiplexing scheme based on a use case associated with the payload data, wherein the use case comprises at least one among a remote sensing use case and a data communication use case.

17. The apparatus of claim 12, comprising:
the multi-level qubit system configured to obtain the qubits encoding the payload data from a quantum storage system configured to store the qubits within at least atomic states that maintain qubit coherence above a threshold coherence level on microsecond timeframes.

18. The apparatus of claim 12, wherein the multiplexing type further comprises temporal multiplexing providing multiplexing over a time domain.

19. The apparatus of claim 12, comprising:
the multi-level qubit system configured to project the qubits onto the physical carrier by modulating at least one optical transmitter that generates an optical signal comprising the transmission signal according to the adjustable multiplexing scheme.

20. A system, comprising:
a transmitter node configured to:
    generate carrier qubits comprising quantum superposition states by at least expanding first basis sets of encoding qubits encoding payload data to carrier qubits having second basis sets expanded from the encoding qubits;
    generate a transmission signal by at least projecting the carrier qubits onto a physical carrier comprising an adjustable over an adjustable multiplexing scheme;
    select the adjustable multiplexing scheme based at least on communication medium conditions and a desired information capacity of the transmission signal by at least selecting a multiplexing degree and a multiplexing type from one or more among a spectral multiplexing scheme comprising a selected quantity of non-overlapping frequencies and a spatial multiplexing scheme comprising a selected quantity of optical vortex state; and
    transmit, by the physical carrier, the transmission signal through a communication medium;
a receiver node configured to:
    receive the transmission signal after propagation through the communication medium; and
    demultiplex the transmission signal in accordance with the adjustable multiplexing scheme to determine at least a portion of the payload data.

\* \* \* \* \*